United States Patent
Yoon

(10) Patent No.: US 9,771,066 B2
(45) Date of Patent: Sep. 26, 2017

(54) BACKWARD DRIVING CONTROL METHOD OF HYBRID VEHICLE

(71) Applicants: Hyundai Motor Company, Seoul (KR); KIA Motors Corporation, Seoul (KR)

(72) Inventor: Young Min Yoon, Suwon-si (KR)

(73) Assignees: HYUNDAI MOTOR COMPANY, Seoul (KR); KIA MOTORS CORPORATION, Seoul (KR)

(*) Notice: Subject to any disclaimer, the term of this patent is extended or adjusted under 35 U.S.C. 154(b) by 43 days.

(21) Appl. No.: 15/081,288

(22) Filed: Mar. 25, 2016

(65) Prior Publication Data

US 2017/0088122 A1    Mar. 30, 2017

(30) Foreign Application Priority Data

Sep. 25, 2015 (KR) .................. 10-2015-0136222

(51) Int. Cl.
- B60W 20/00    (2016.01)
- B60W 20/40    (2016.01)
- B60W 40/076   (2012.01)
- G06F 19/00    (2011.01)

(52) U.S. Cl.
CPC .......... *B60W 20/40* (2013.01); *B60W 40/076* (2013.01)

(58) Field of Classification Search
CPC ..... B60W 20/00; B60W 20/076; G06F 19/00; G06F 17/00

USPC ........................................................... 701/22
See application file for complete search history.

(56) References Cited

U.S. PATENT DOCUMENTS

| 4,768,636 A * | 9/1988 | Ito ..................... B60W 10/02 192/222 |
| 2003/0001391 A1 | 1/2003 | Kuang et al. |
| 2010/0125020 A1* | 5/2010 | Ikegami ............... B60K 6/365 477/3 |
| 2013/0096761 A1* | 4/2013 | Kuroda .................. B60K 6/48 701/22 |

FOREIGN PATENT DOCUMENTS

| JP | 2010-254076 A | 11/2010 |
| JP | 2013-091353 A | 5/2013 |
| JP | 2015-113057 A | 6/2015 |
| JP | 2015-128914 A | 7/2015 |

* cited by examiner

*Primary Examiner* — Tan Q Nguyen
(74) *Attorney, Agent, or Firm* — Brinks Gilson & Lione

(57) ABSTRACT

A backward driving control method of a hybrid vehicle is disclosed. The backward driving control method includes: confirming the driving mode of the vehicle, if a shift lever is located at a position R; comparing the tilt of a road surface with a predetermined tilt, as a result of confirmation of the driving mode, if the driving mode is a motor driving mode; and engaging a first gear as a shift stage and driving a motor in a reverse direction, as a result of comparison of the tilt, if the tilt of the road surface is below the predetermined tilt.

8 Claims, 2 Drawing Sheets

BACKWARD DRIVING CONTROL METHOD OF HYBRID VEHICLE

CROSS-REFERENCE TO RELATED APPLICATION

Figure 1:
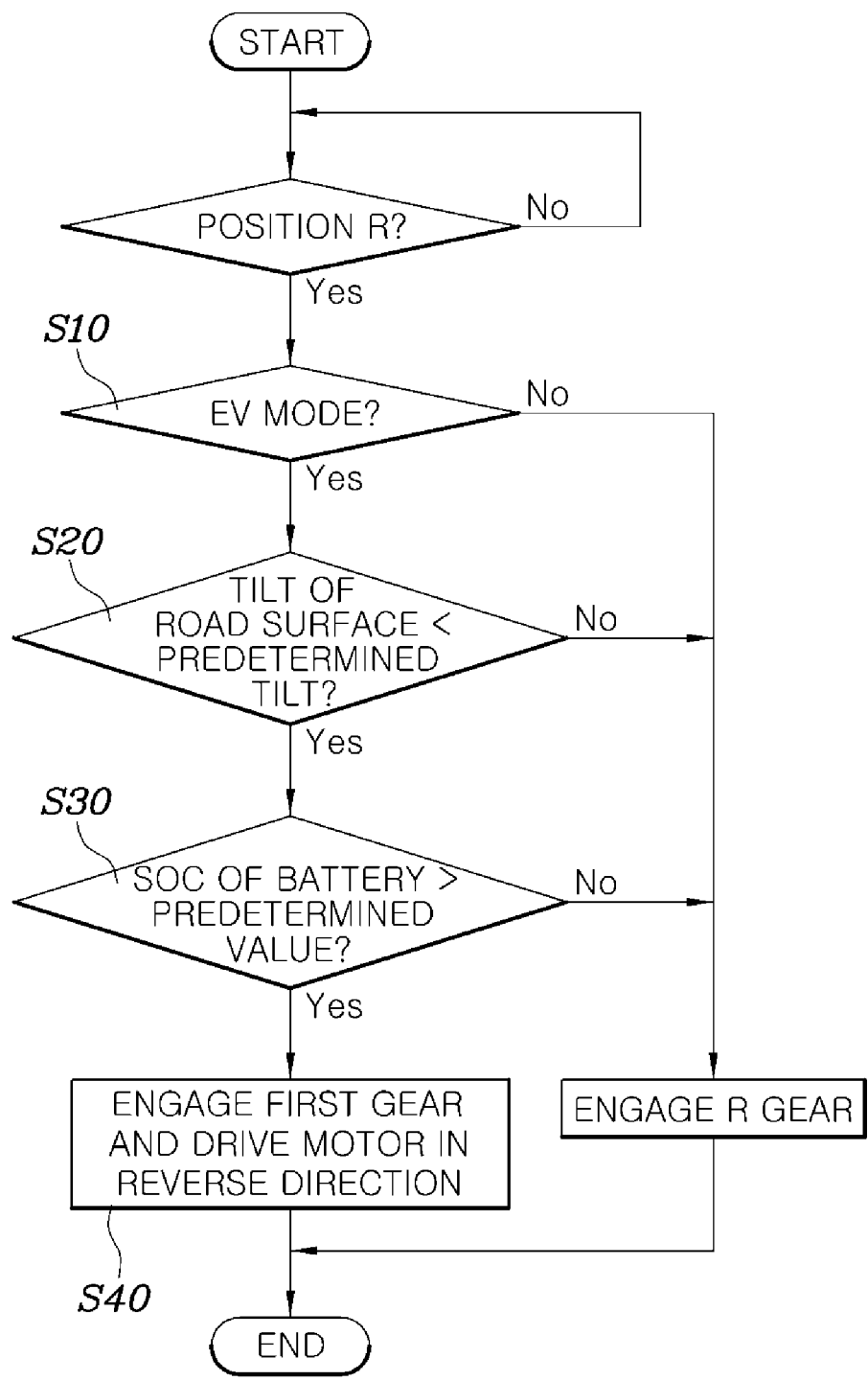

This application claims the priority to and the benefit of Korean Patent Application No. 10-2015-0136222, filed on Sep. 25, 2015, which is incorporated herein by reference in its entirety.

FIELD

The present disclosure relates to a backward driving control method of a hybrid vehicle.

BACKGROUND

The statements in this section merely provide background information related to the present disclosure and may not constitute prior art.

In general, a dual clutch transmission (DCT) includes forward gears and one reverse gear, and controls an even-numbered clutch so as to engage the R gear to execute backward driving. Here, an odd-numbered clutch is released under the condition that the first gear is pre-engaged, thus reducing gear backlash noise generated during driving using the R gear. Further, during forward driving, the R gear is released.

Therefore, during low-speed R-D or D-R lurch driving, the first gear and the R gear are frequently engaged/released, thus causing problems, such as delay in driving responsiveness and generation of an excessive amount of noise. Particularly, in case of a hybrid vehicle, a driver hears more noise in an EV mode.

In order to solve such problems, technology in which, in order to execute backward driving, the R gear is not used. Instead, a motor is driven in the reverse direction while the first gear is engaged in prior art.

However, if power of the motor or the state of charge (SOC) of a battery is insufficient during backward driving, the EV mode (e.g., a driving mode only by a motor) should be changed to the HEV mode (e.g., driving by a motor and an engine). Here, during a process of changing driving of the motor in the reverse direction to driving of the motor in the regular direction, the vehicle may slip.

SUMMARY

The present disclosure provides a backward driving control method of a hybrid vehicle in which engagement of a first gear and driving of the motor in a reverse direction are controlled according to the driving mode of the hybrid vehicle and the tilt of a road surface so as to inhibit or prevent the vehicle from slipping.

The present disclosure for a driving control method of a hybrid vehicle includes: a confirming step of confirming the driving mode of the vehicle, if a shift lever is located at a position R; a comparing step of comparing the tilt of a road surface with a predetermined tilt, as a result of confirmation of the driving mode, if the driving mode is a motor driving mode; and an engaging step of engaging a first gear as a shift stage and driving a motor in a reverse direction, as a result of comparison of the tilt, if the tilt of the road surface is below the predetermined tilt.

As a result of confirmation of the driving mode, if the driving mode is not the motor driving mode, an R gear as the shift stage may be engaged.

As a result of comparison of the tilt, if the tilt of the road surface is not below the predetermined tilt, the R gear as the shift stage may be engaged.

The backward driving control method may further include comparing the SOC of a high voltage battery with a predetermined value, as a result of comparison of the tilt, if the tilt of the road surface is below the predetermined tilt, and, as a result of comparison of the SOC of the high voltage battery with the predetermined value, if the SOC of the high voltage battery exceeds the predetermined value, driving of the motor in the reverse direction may be executed.

As a result of comparison of the SOC of the high voltage battery with the predetermined value, if the SOC of the high voltage battery does not exceed the predetermined value, the R gear as the shift stage may be engaged.

When the R gear is engaged, the motor may be driven in the regular direction.

Further areas of applicability will become apparent from the description provided herein. It should be understood that the description and specific examples are intended for purposes of illustration only and are not intended to limit the scope of the present disclosure.

DRAWINGS

Figure 2:
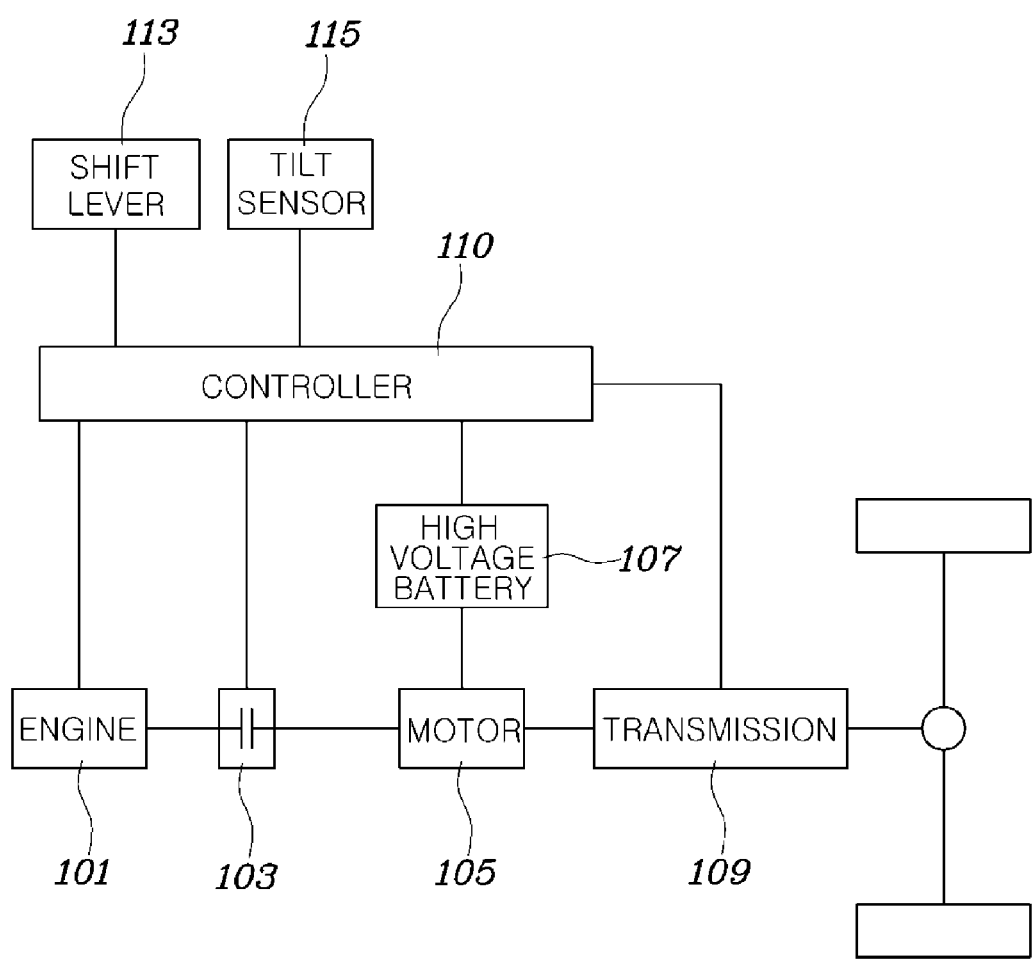

In order that the disclosure may be well understood, there will now be described various forms thereof, given by way of example, reference being made to the accompanying drawings, in which:

FIG. 1 is a flowchart illustrating a backward driving control method of a hybrid vehicle; and FIG. 2 is a view illustrating a backward driving control apparatus of a hybrid vehicle.

The drawings described herein are for illustration purposes only and are not intended to limit the scope of the present disclosure in any way.

DETAILED DESCRIPTION

The following description is merely exemplary in nature and is not intended to limit the present disclosure, application, or uses. It should be understood that throughout the drawings, corresponding reference numerals indicate like or corresponding parts and features.

Hereinafter, a backward driving control method of a hybrid vehicle in accordance with one embodiment of the present disclosure will be described with reference to the accompanying drawings.

FIG. 1 is a flowchart illustrating a backward driving control method of a hybrid vehicle, and FIG. 2 is a view illustrating a backward driving control apparatus of a hybrid vehicle.

With reference to FIGS. 1 and 2, a backward driving control method of a hybrid vehicle may include confirming the driving mode of the vehicle, if a shift lever 113 is located at a position R (Operation S10), comparing the tilt of a road surface with a predetermined tilt (Operation S20), as a result of confirmation of the driving mode (Operation S10), if the driving mode is a motor driving mode, and engaging a first gear and driving a motor 105 in a reverse direction (Operation S40), as a result of comparison of the tilt (Operation S20), if the tilt of the road surface is below the predetermined tilt.

That is, in the backward driving control method of the present disclosure, a possibility of switching the driving mode of the hybrid vehicle from the motor driving mode to an engine driving mode may be judged before backward driving of the vehicle is executed through engagement of the first gear and driving of the motor in the reverse direction, thereby inhibiting or preventing slippage of the vehicle and generation of a sense of power disconnection due to switching of the driving mode of the vehicle.

In more detail, if location of the shift lever 113 at the position R is sensed, a controller 110 determines whether or not the driving mode of the vehicle is the motor driving mode (Operation S10). If the driving mode of the vehicle is the electric vehicle (EV) mode, the vehicle is driven only using the motor 105 and, thus, the vehicle is driven in the backward direction by engaging the first gear as an odd-numbered shift gear of a transmission 109 and then driving the motor 105 in the reverse direction so as to reduce noise generated due to gear shift. In this case, since the first gear is in the engaged state, when the transmission lever 113 is changed from the position R to the position D, the forward driving may be executed by having the motor 105 driven in the regular direction without gear shift, and thus lurch driving may be executed. As a result, generation of noise may be inhibited or prevented under the lurch driving condition.

On the other hand, as a result of confirmation of the driving mode (Operation S10), if the driving mode of the vehicle is not the motor driving mode, the R gear as a shift stage may be engaged. For example, if the driving mode of the vehicle is the HEV mode or the engine mode, the controller 110 drives the vehicle using an engine 101 and, thus backward driving through engagement of the first gear may not be executed. Instead, the R gear may be engaged through an even-numbered shift stage of the transmission 109.

Further, as a result of confirmation of the driving mode (Operation S10), if the driving mode of the vehicle is the motor driving mode, the controller 110 may compare the tilt value of a road surface with a predetermined tilt value (Operation S20). Here, the controller 110 may sense a tilt value of the road surface through a tilt sensor 115.

If the vehicle is continuously driven in the EV mode in the steep tilt state of the road surface, the driving mode of the vehicle may be shifted to the HEV mode or the engine mode due to insufficient output of the motor 105. In this case, the controller 110 releases the first gear and engages the R gear as the even-numbered shift stage, and such gear shift provides a sense of power disconnection to a driver so that the driver may be inconvenienced during driving.

Therefore, in a situation where backward driving is required, the controller 110 engages the first gear and then drives the motor 105 in the reverse direction to execute backward driving, only if the driving mode of the vehicle is the EV mode and the tilt of the road surface is below the predetermined tilt, thereby reducing generation of noise.

On the other hand, as a result of comparison of the tilt (Operation S20), if the tilt of the road surface is not below the predetermined tilt, the R gear may be engaged. That is, in the hybrid vehicle driving in the EV mode, if the tilt of the road surface is not below the predetermined tilt, a driving mode shift situation may occur due to insufficient output of the motor 105. Therefore, in order to inhibit or prevent a sense of power disconnection and slippage of the vehicle due to gear shift of the transmission 109, backward driving through the R gear may be executed from the initial stage.

In addition, the backward driving control method of the present disclosure may further include comparing the SOC of a high voltage battery 107 with a predetermined value (Operation S30), as a result of comparison of tilt (Operation S20), if the tilt of the road surface is below the predetermined tilt, and, as a result of comparison of the SOC (Operation S30), if the SOC of the high voltage battery 107 exceeds the predetermined value, driving of the motor in the reverse direction (Operation S40) may be executed.

In more detail, if backward driving of the vehicle is required in the EV mode, the controller 110 checks the SOC of the high voltage battery 107 to drive the motor 105. If the SOC of the high voltage battery 107 does not exceed the predetermined value, driving of the motor 105 is disenabled due to discharging of the high voltage battery 107 during backward driving and thus the driving mode may be changed. Therefore, only if the SOC of the high voltage battery 107 exceeds the predetermined value, the first gear may be engaged and the motor 105 may be driven in the reverse direction so as to execute backward driving.

On the other hand, as a result of comparison of the tilt (Operation S30), if the SOC of the high voltage battery 107 does not exceed the predetermined value, the R gear may be engaged. That is, if the SOC of the high voltage battery 107 does not exceed the predetermined value, the controller 110 may inhibit or prevent backward driving of the vehicle through driving of the motor 105 in the reverse direction, thus inhibiting or preventing slipping of the vehicle and power disconnection due to shift of the driving mode during backward driving.

Further, when the R gear is engaged, the motor 105 may be driven in the regular direction. That is, upon determination that there is a high possibility of changing the driving mode of the vehicle, backward driving of the vehicle through the R gear may be executed by driving the motor 105 in the regular direction while the R gear is engaged.

In one form, the transmission 109 may be a DCT including a plurality of clutches, a clutch 103 may be provided between the engine 101 and the motor 105 so as to connect/disconnect the engine 101 and the motor 105, and the controller 110 may shift the driving mode of the vehicle by controlling a corresponding clutch.

As is apparent from the above description, a backward driving control method of a hybrid vehicle in accordance with the present disclosure may inhibit or prevent shift of a gear of a transmission while the driving mode of the vehicle is switched during backward driving of the vehicle through engagement of the first gear and driving of a motor in the reverse direction, thus inhibiting or preventing slippage of the vehicle and lowering of a sense of power transmission.

Further, backward driving of the vehicle through engagement of the first gear and driving of the motor in the reverse direction may be executed, thereby reducing noise generated by gear engagement due to lurch driving, improving driving responsiveness, inhibiting or preventing R gear baulking, and improving regenerative braking of the motor.

Although the embodiments of the present disclosure have been disclosed for illustrative purposes, those skilled in the art will appreciate that various modifications, additions and substitutions are possible, without departing from the scope and spirit of the present disclosure.

What is claimed is:

1. A backward driving control method of a hybrid vehicle, comprising:
    a confirming step of confirming, by a controller, a driving mode of a vehicle when a shift lever is located at a position R;

a comparing step of comparing, by the controller, a tilt value of a road surface with a predetermined tilt value, when the confirming step determines that the driving mode is a motor driving mode; and an engaging step of engaging a first gear and driving a motor in a reverse direction, when the comparing step determines that the tilt value of the road surface is below the predetermined tilt value.

2. The backward driving control method according to claim 1, wherein an R gear is engaged when the confirming step determines that the driving mode is not the motor driving mode.

3. The backward driving control method according to claim 2, wherein, when the R gear is engaged, the motor is driven in a regular direction.

4. The backward driving control method according to claim 1, wherein an R gear is engaged when the comparing step determine that the tilt value of the road surface is not below the predetermined tilt value.

5. The backward driving control method according to claim 4, wherein, when the R gear is engaged, the motor is driven in a regular direction.

6. The backward driving control method according to claim 1, further comprising a SOC comparing step of comparing a state of charge (SOC) of a high voltage battery with a predetermined value when the comparing step determines that the tilt value of the road surface is below the predetermined tilt value, wherein the motor is driven in the reverse direction when the SOC comparing step determines that the SOC of the high voltage battery exceeds the predetermined value.

7. The backward driving control method according to claim 6, wherein an R gear is engaged when the SOC comparing step determines that the SOC of the high voltage battery does not exceed the predetermined value.

8. The backward driving control method according to claim 7, wherein, when the R gear is engaged, the motor is driven in a regular direction.

* * * * *